US012005278B1

(12) United States Patent
Ross-Powers

(10) Patent No.: US 12,005,278 B1
(45) Date of Patent: Jun. 11, 2024

(54) OPERATIONAL ATTACHMENT FOR PORTABLE HOSE-EQUIPPED FIRE EXTINGUISHERS AND METHODS OF USE

(71) Applicant: Candida Ross-Powers, Sacramento, CA (US)

(72) Inventor: Candida Ross-Powers, Sacramento, CA (US)

( * ) Notice: Subject to any disclaimer, the term of this patent is extended or adjusted under 35 U.S.C. 154(b) by 0 days.

(21) Appl. No.: 18/512,818

(22) Filed: Nov. 17, 2023

(51) Int. Cl.
*A62C 13/76* (2006.01)

(52) U.S. Cl.
CPC .................................... *A62C 13/76* (2013.01)

(58) Field of Classification Search
CPC ......... A62C 13/00; A62C 13/64; A62C 13/78; A62C 13/76; A62C 31/00; A62C 31/02; A62C 31/28; A62C 17/00
USPC ........................................................... 169/71
See application file for complete search history.

(56) References Cited

U.S. PATENT DOCUMENTS 1,933,919 A * 11/1933 McPherson ............ A62C 31/28 248/80
2,506,074 A 5/1950 Fawkes
6,279,664 B1 8/2001 Yanovsky et al.
10,350,442 B2 7/2019 Kronebusch
10,702,727 B2 * 7/2020 Holloway .............. A62C 13/64
10,828,519 B2 11/2020 Kim et al.
11,383,113 B2 7/2022 Holloway
2004/0188473 A1 9/2004 Groh et al.
2008/0245832 A1 10/2008 Willman
2013/0341369 A1 12/2013 Kacmarcik
2016/0175629 A1 6/2016 Henyan
2018/0311520 A1 * 11/2018 Kim ....................... A62C 13/64
2020/0282245 A1 9/2020 Holloway
2022/0143440 A1 5/2022 Kim et al.

* cited by examiner

*Primary Examiner* — Christopher R Dandridge
(74) *Attorney, Agent, or Firm* — Sierra IP Law, PC; Mark D. Miller

(57) ABSTRACT

The present invention provides methods and apparatus for use with common portable hose-equipped fire extinguishers that make the fire extinguishers usable and operable by persons having limited physical abilities. Embodiments of the apparatus include two aspects: a rigid lever lever, which may be provided in the shape of an “L”, and an adjustable harness with ring. The ring and lever with adjusting harness (RALAH) is intended to be installed on portable hose-equipped fire extinguishers. Embodiments of the invention include at least one harness strap attached to the fire extinguisher that may be released using a ring, and then wrapped over the head or shoulder of a user to support the fire extinguisher; a rigid (sometimes L-shaped) lever attached to both the handle and hose of the fire extinguisher; and at least one ring attached to the fire extinguisher hose that enables a person having limited physical abilities to manipulate the hose and discharge the contents of the extinguisher.

11 Claims, 9 Drawing Sheets

OPERATIONAL ATTACHMENT FOR PORTABLE HOSE-EQUIPPED FIRE EXTINGUISHERS AND METHODS OF USE

FIELD OF THE INVENTION

The present invention relates generally to the operation of portable fire extinguishers and, more particularly, to attachments for use with portable hose-equipped fire extinguishers that make them operable by persons having limited physical abilities, and related methods.

BACKGROUND OF THE INVENTION

Portable fire extinguishers are common and are known to the public and are in public venues for use by the public and are intended to be used for the safety of the public and for the preservation of property. Current designs and operation of common portable fire extinguishers, however, require a person to have two hands and the grip strength to operate the fire extinguisher. These operational requirements essentially exclude persons with arm and/or hand limitations from using a portable fire extinguisher. These requirements deny protection and therefore put such people at greater risk of losing life and limb.

Portable hose-equipped fire extinguishers are commonplace in American infrastructure. They are found wherever people gather, such as in office buildings, schools, sporting venues, and in places of manufacturing. Portable fire extinguishers have proven extremely effective in stopping fires when they initially begin and much of this success is found with the extinguisher being accessible and easy to quickly use. Laws currently require fire extinguishers to be present in industrial, commercial, and residential areas and in all buildings except for some private family homes. There are legal requirements to have portable fire extinguishers in apartment buildings, businesses, day-cares, jails and detention centers, schools, health care facilities, hotels and rooming houses, stores, and board and care facilities.

The importance of portable fire extinguishers to the health and safety of the general public is further noted by codes requiring that extinguishers be placed in visible and easy-to-reach places along hallways, near exits, in common public locations, and in meeting rooms.

Building and Fire Codes also regulate the visibility of the fire extinguisher's operation label, installation pertaining to the extinguisher's mount regarding height from flooring, storage and weight of the extinguisher, the type of extinguisher to be available, and the availability of extinguishers per specific area space. The requirements of portable fire extinguishers as noted in Building and Fire Code are despite, and in addition to, any other fire suppression apparatus and systems that may also be in place. This speaks heavily to the importance that the portable fire extinguisher has and the role that it plays in preventing property loss, and in saving lives.

As important as the portable fire extinguisher is, however, it still has a tremendous vulnerability. The common fire extinguisher requires two hands with adequate grip strength to operate. One hand is used to carry the extinguisher and to squeeze the handles together in order to discharge the fire extinguishing chemical spray. The other hand is used to hold and direct the hose that is attached to the unit, to "sweep" the base of the fire with the extinguishing chemical spray.

However, people who are missing an arm or a hand cannot use common portable fire extinguishers because they are designed for use by a person with two functioning hands.

Those persons who have left or right-side weakness, paralysis, persons who are arthritic, those who have their hand or arm in a cast, or who may have just been injured in the very fire that they desire to extinguish, will have great difficulty, or most probably, an inability, to use the common portable fire extinguisher that so much and so many, depend upon. These conditions and circumstances inhibit and/or effectively deny persons with such disabilities or handicaps, equal fire protection and essentially, an equal chance of survival during times of fire crisis. As no one knows when such illness or injury to their arms or hands may occur, any member of the general public could find themselves without that equal chance of survival at any given moment.

It is therefore desirable to provide methods and apparatus for use with common portable hose-equipped fire extinguishers that will make such fire extinguishers usable and operable by persons having less than two working arms and hands.

SUMMARY OF THE INVENTION

The present invention provides an adaptive device by which people who did not have two, fully functional hands may still use a portable fire extinguisher to save themselves, their family, and/or their property. When appropriately installed on a portable hose-equipped fire extinguisher, the present invention transforms a common portable fire extinguisher, making it useable for persons who do not have two hands with grip strength. This transformation allows a person to use the extinguisher with only a single finger or a thumb if that is what is available to them.

The present invention provides methods and apparatus for use with common portable hose-equipped fire extinguishers that make the fire extinguishers usable and operable by persons having limited physical abilities. Embodiments of the apparatus include two aspects: a rigid lever, which may be provided in the shape of an "L", and an adjustable harness with ring. The ring and lever with adjusting harness (RALAH) is intended to be installed on portable hose-equipped fire extinguishers. Embodiments of the invention include at least one harness strap attached to the fire extinguisher that may be released using a ring, and then placed over the head, and/or over the head, or otherwise wrapped around or over the neck or shoulder of a user to support the fire extinguisher; a rigid (sometimes L-shaped) lever attached to both the handle and hose of the fire extinguisher; and at least one ring attached to the fire extinguisher hose that enables a person having limited physical abilities to manipulate the hose and discharge the contents of the extinguisher.

In some embodiments, one section of the lever may be firmly secured to the handle of the fire extinguisher. In these embodiments, another section of the lever may be flexibly engaged with a neck of the fire extinguisher and also flexibly engaged with the fire extinguisher hose. In some embodiments, these flexible engagements may be provided using springs, such that one spring urges the lever toward the fire exginguisher, and the other spring urges the hose toward the lever. In some embodiments, the harness may be compressed against the fire extinguisher and held in place with a belt having a ring thereon allowing for easy release of the harness. The harness itself may comprise one or two straps. In some embodiments, the harness strap(s) may have rings at end(s) thereof. In some embodiments, the harness strap(s) may have dense pile material on one surface and a plurality of hooks on the same or another surface for detachable interengagement allowing the length(s) of the strap(s) to be adjusted.

In embodiments of the invention, a ring and lever with adjusting harness is presented as a new and unique invention that may be installed on a portable hose-equipped fire extinguisher. This renders the fire extinguisher useable for persons who may be missing a limb or have other injury or illness which prevents them from having full use of two hands. These embodiments allow a person to use a common portable hose-equipped fire extinguisher with only a thumb or finger if that was all the person had. The installation of these embodiments on portable hose-equipped fire extinguishers located throughout public buildings would be a very large step toward rectifying the current state where persons with disabilities or handicaps in their arms and/or hands are largely unable to use what current Building and Fire Codes state must be available to them as occupants and visitors of buildings. Embodiments of the present invention will allow people who do not have full use of their hands to be able to use a portable hose-equipped fire extinguisher to save themselves and their property.

Embodiments of the present invention also include methods of operating a portable hose-equipped fire extinguisher using as little as one thumb or one finger using a ring and lever and an adjustable harness apparatus attached to the fire extinguisher. In these embodiments, the harness is attached to the fire extinguisher body and folded up against it. A belt holding the folded harness against the fire extinguisher body may be opened by pulling on a first ring, allowing the harness to unfold. Then, the unfolded harness may be placed over the head and/or head and shoulder. The user can then adjust the harness to meet their physical needs by using either of the harness rings. This is accomplished by the user pulling on the rings to separate the pile and loop surfaces of the strap allowing the strap to lengthen or shorten, and then bringing the pile and loop surfaces back together and pressing them into place. It is to be appreciated that the length of the harness strap may be adjusted based on the size or needs of the individual using it, after which the strap may be secured against itself by pressing the plurality hooks on one surface of the strap against the plurality of loops on the other surface of the strap for secure interengagement. This engagement of the harness strap allows an individual to carry the fire extinguisher without using arms or hands. The individual may then enable the fire extinguisher (e.g., by pulling a locking ring/pin or other locking device) to enable the contents to be discharged. The individual may then use the ring attached to the fire extinguisher hose to point the hose at the fire. This movement of the hose using the ring also moves the rigid lever, causing the lever to depress the handle at the top of the fire extinguisher, resulting in a discharge through the hose. Releasing the hose ring allows springs to pull the lever back against the fire extinguisher, stopping the discharge.

Each aspect of the invention is designed to be utilized with either the left or right hand. Embodiments of the invention are also designed to be used by a person whose hands are not fully functionable and may only have a thumb or a finger to use. This is accomplished by the person utilizing the rings which are attached to each aspect of the invention. In using the rings, the person inserts their finger or thumb, or even prosthetic apparatus, into the attached ring and pulls.

Embodiments of the invention do not prevent or interfere with a person using a portable hose-equipped fire extinguisher without using the installed adaptive devices of the present invention. The operation of the extinguisher does not change and a person without the need for the adaptive devices of the present invention may still use a extinguisher without impediment or difficulty, and without having to first remove the invention from the extinguisher.

In some aspects of the invention, an apparatus for use with a portable hose-equipped fire extinguisher is provided that comprises a lever having a first segment that is firmly engaged with the upper handle of the fire extinguisher with an anchor strap, and a second segment that extends along a body of the fire extinguisher having an opening therein for receiving a hose of the fire extinguisher; a hose directing assembly is flexibly attached between the second segment of the lever and a distal end of the hose, the hose directing assembly including first strap around the hose and a first directing ring attached to said first strap; a harness assembly comprising at least one second strap is provided in which a proximal end of the second strap is engaged with a body of the fire extinguisher, a distal end of the second strap is attached to a second adjusting ring, and loop and pile material is provided on at least one surface of the second strap for detachably secure interengagement; and a belt is provided having a third release ring thereon with loop and pile material on at least one surface thereof that releasably holds the harness assembly in a folded-up condition against the fire extinguisher body.

In related aspects, the hose directing assembly further comprises a first spring connected between the hose and the second segment of the lever that allows the hose to be pulled away from the lever and directed toward a fire, and urges the hose against the second segment of the lever when not in use. In other aspects, a third strap is engaged around a neck of the fire extinguisher wherein loop and pile material is provided on at least one surface thereof for detachably secure interengagement of the third strap around said neck, and a second spring is attached between the third strap and the second segment of the lever for urging the second segment of the lever against the body of the fire extinguisher. This spring allows for necessary movement of the lever while keeping the lever stable and in place. In other aspects, an anchor strap is provided that keeps the lever aligned with and connected to the upper handle so that when pressure on the lever is applied and the handle responds to that pressure, the lever does not slide off. This straps promotes and allows the lever and handle to work in unison. In other aspects, a grip strip is engaged around the body of the fire extinguisher, and a fourth strap is provided between the grip strip and the harness assembly, the fourth strap having a first pocket at a proximal end thereof for receiving the grip strip, and a second pocket at a distal end thereof for receiving at least one D-ring, and the second strap extends through the D-ring.

In other aspects, embodiments of the invention include methods for operating a hose-equipped fire extinguisher by a person having limited physical mobility comprising the steps of: pulling a release ring attached to a releasable belt to release a folded-up harness assembly attached to a fire extinguisher; wrapping a first strap of said harness assembly over the head and/or head and shoulders of a user and adjusting the length of said strap using a ring attached at a distal end of said strap; pressing surfaces of said first strap against each other to interengage pile and loop material on said surfaces to secure said strap around the neck or shoulder of said user; and pulling on a directing ring attached to a second strap at a distal end of a hose of said fire extinguisher to direct a discharge from said fire extinguisher, wherein said second strap is flexibly attached to a second segment of a lever, said lever having a first segment that is securely engaged against a handle of said fire extinguisher such that directing said hose causes the first segment of said lever to depress said handle resulting in a discharge through said hose.

In another aspects of the invention, embodiments include methods for equipping a portable hose-equipped fire extinguisher for use by a person having limited physical mobility comprising the steps of: attaching a first segment of a lever with an upper handle of the fire extinguisher; extending a hose of the fire extinguisher through an opening in a second segment of said lever; attaching a first strap to a distal end of said hose, wherein a directing ring is attached said first strap, and a spring is connected between said first strap and a distal end of the second segment of said lever; attaching a harness assembly to said fire extinguisher on a side opposite from said hose, said harness assembly comprising at least one second strap wherein a proximal end of the at least one second strap is engaged with a body of the fire extinguisher, a distal end of the at least one second strap is attached to a second adjustment ring, and loop and pile material is provided on at least one surface of the at least one second strap for detachably secure interengagement of the second strap against itself; and folding up the harness assembly and temporarily securing the harness assembly against said fire extinguisher using a belt having a third release ring thereon with loop and pile material on at least one surface thereof for detachably secure interengagement of the third strap against itself that releasably holds the harness assembly in a folded-up condition against said fire extinguisher body.

In related aspects, the methods may comprise the additional step of attaching a third strap around a neck of the fire extinguisher wherein loop and pile material is provided on at least one surface thereof for detachably secure interengagement of the third strap against itself and around said neck, wherein a second spring is attached between the third strap and the second segment of said lever for urging the second segment of the lever against the body of the fire extinguisher. In related aspects, the methods may comprise the additional step of attaching a grip strip around the body of the fire extinguisher, wherein a fourth strap is provided between said grip strip and said harness assembly, said fourth strap having a first pocket at a proximal end thereof for receiving said grip strip, and a second pocket at a distal end thereof for receiving at least one D-ring, and wherein said at least one second strap extends through said at least one D-ring. In some aspects, the methods may comprise the additional step of attaching a fifth strap around the first segment of the lever and an upper handle of the fire extinguisher.

It is therefore an object of the present invention to provide methods and apparatus that allow an individual with limited physical mobility to operate a hose-equipped fire extinguisher.

It is also an object of the present invention to provide a ring and lever apparatus with an adjustable harness for attachment to a hose-equipped fire extinguisher that allow the fire extinguisher to be supported by and operated by an individual having limited physical mobility, such as without limitation, only one functional hand, finger, thumb or prosthesis.

It is also an object of the present invention to allow a person who has arm/hand limitations or disability needs to carry something or operate something that requires fully functional hands.

It is also an object of the present invention to provide a harness that may be used to carry items and to operate items such as a leaf blower, a power hose, a paint sprayer, and the like.

It is also an object of the present invention to provide a lever that may be used in various ways when attached to items to engage them for use in employment, for recreation, and in the home.

The above-described objects, advantages and features of the invention, together with the organization and manner of operation thereof, will become apparent from the following detailed description when taken in conjunction with the accompanying drawings, wherein like elements have like numerals throughout the several drawings described herein. Further benefits and other advantages of the present invention will become readily apparent from the detailed description of the preferred embodiments.

The drawings are not at scale and present a simplified representation of various features illustrative of the basic principles of the invention. Certain invention features such as dimension, orientation, location, shape and material will be determined by application, size and shape.

DETAILED DESCRIPTION

Reference will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the invention, including different combinations of the features identified herein. In the following disclosure, specific details are given to provide a thorough understanding of the invention. However, it will be apparent to one skilled in the art that the present invention may be practiced without all of the specific details provided.

Figure 1:
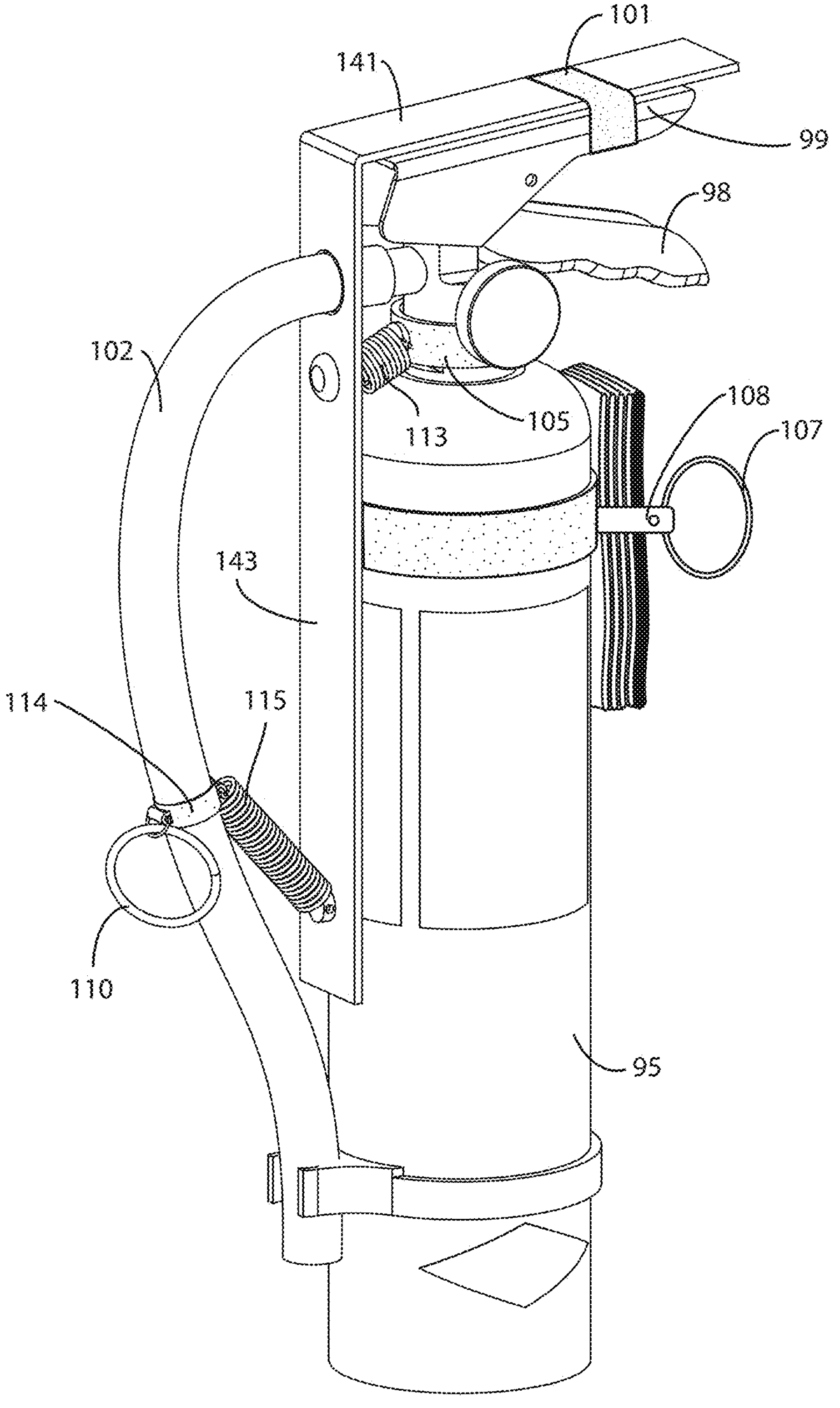
FIG. 1 is a perspective view of an exemplary embodiment of the present invention installed on a hose-equipped fire extinguisher.
Figure 2:
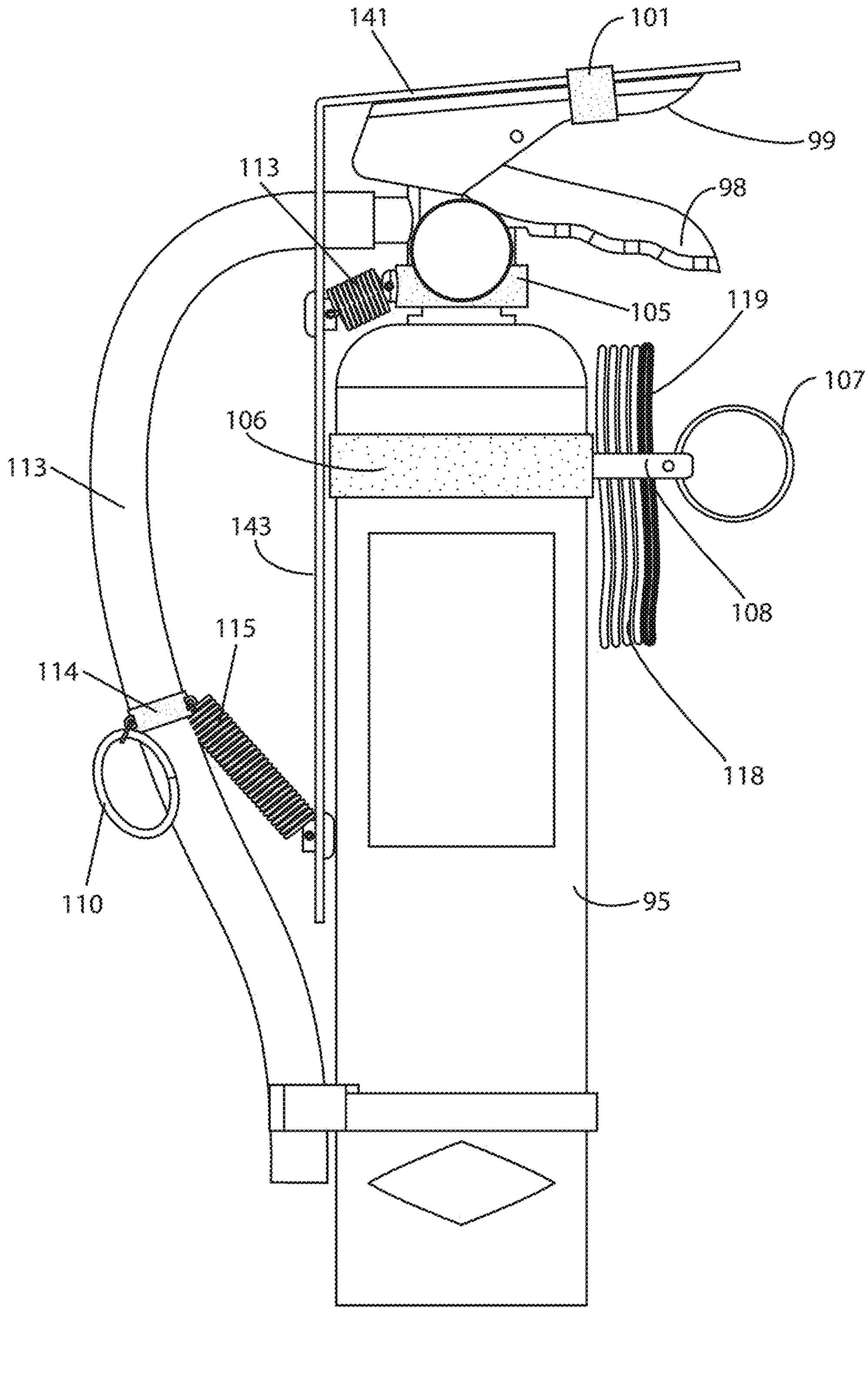
FIG. 2 is a front view of the embodiment of FIG. 1.
Figure 3:
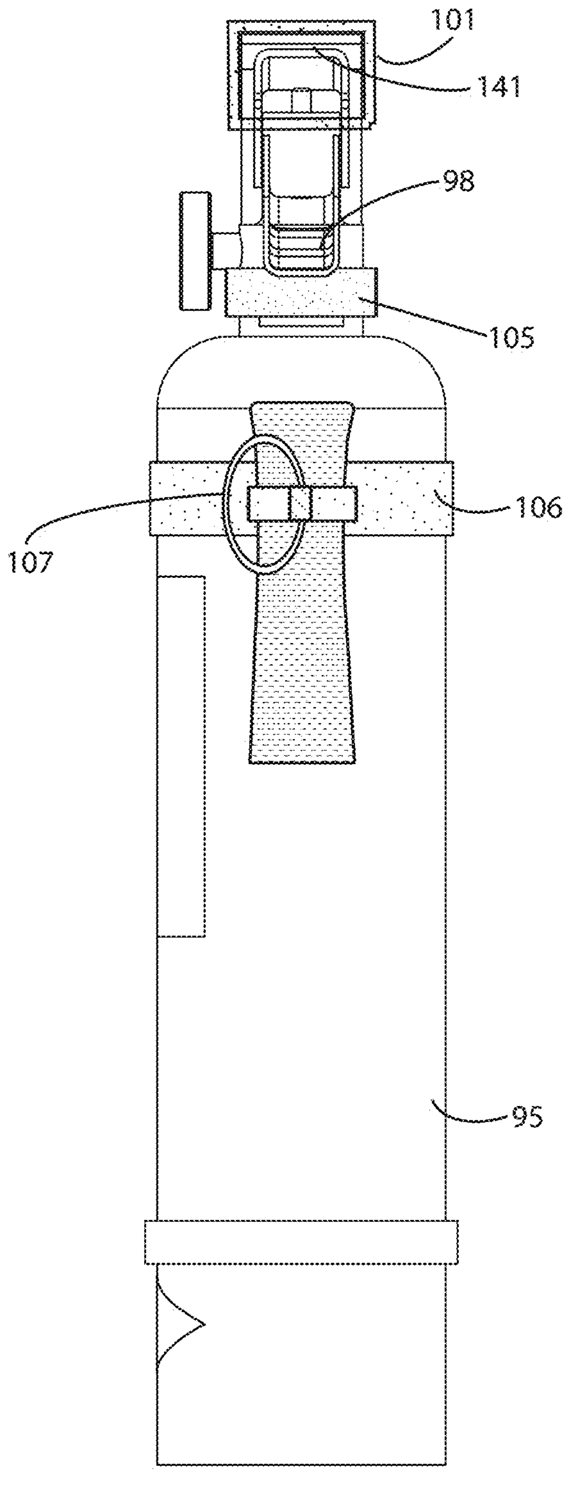
FIG. 3 is a side view of the embodiment of FIG. 1.
Figure 4:
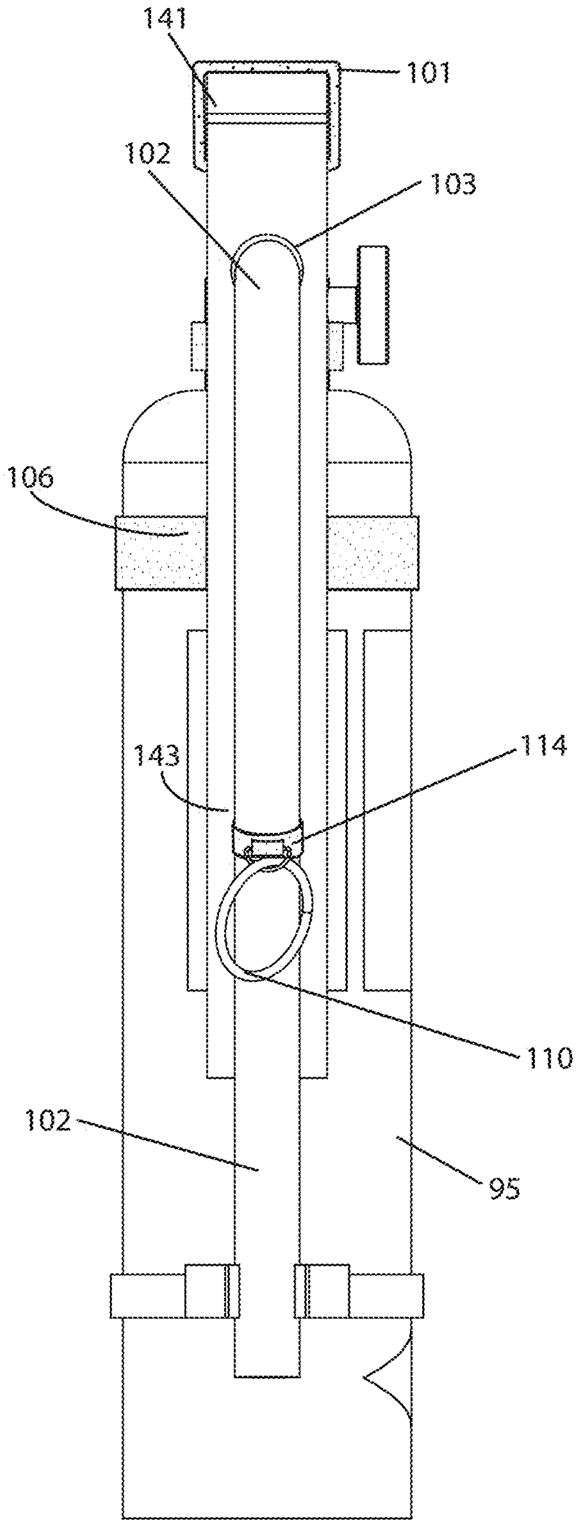
FIG. 4 is an opposite side view of the embodiment of FIG. 1.

Referring to the drawings, wherein like reference characters designate like or corresponding parts throughout the several views, and referring first to FIG. 1, it is seen that the present invention is designed to be attached to a hose-equipped fire extinguisher having a body (ordinarily a cannister) 95 for holding compress fire retardant, handles 98, 99 for causing the contents of the cannister to be discharged, and a discharge hose 102 through which the fire retardant exits. It is to be appreciated that in different embodiments, the size, length and angle of the component parts are variable, and should be consistent with the fire extinguisher targeted for installation.

A gripping strap or strip 106 may be provided for attachment of the harness straps 118, 119 to the body/cannister 95 of the fire extinguisher. The grip strip 106 may be placed at an upper end of the cylindrical portion of the cannister. Grip strip 106 may be provided with an adhesive underside that adheres to the cannister to secure the grip strip 106 in place. In some embodiments, a protective film may be provided that covers the adhesive side of grip strip 106. This film may be peeled away to allow the adhesive side of the grip strip 106 to be attached to the cannister for installation.

Figure 8:
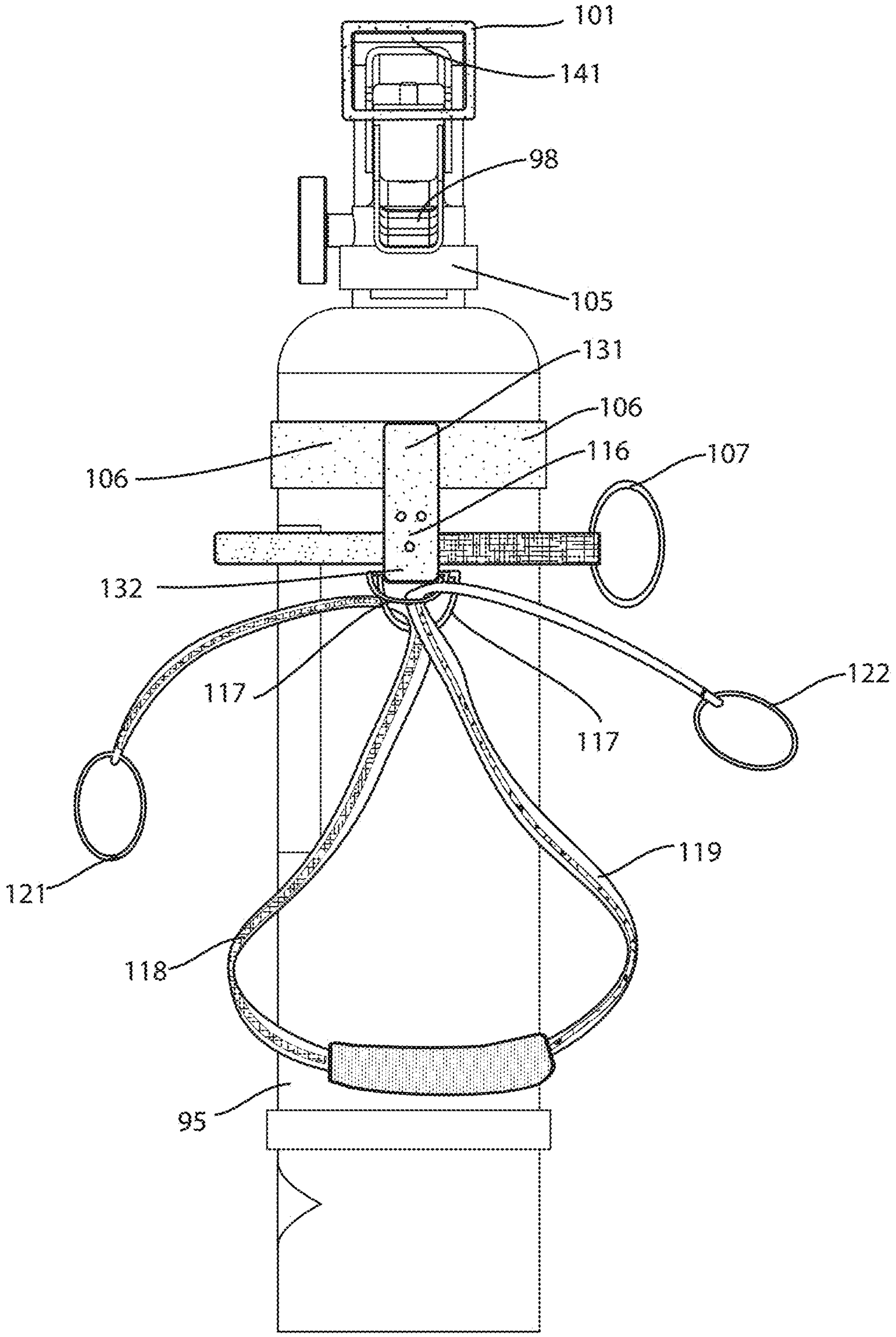
FIG. 8 is a side side view of an embodiment of the present invention showing the harness in a released condition.

A D-ring loop 116 is provided having two enclosed ends forming pockets. The cannister grip strip 106 runs through a pocket 131 at one end of the the D-ring loop 116, and one or more D-rings 117 run through another pocket 132 at the opposite end. The D-ring loop may be positioned directly in line with and below the handles 98, 99 of the fire extinguisher, as shown in FIG. 8. In some embodiments, the D-ring loop 116 may be made of 1½ inch strapping material, and may be comprised of nylon and/or cotton. Right and left adjusting harness straps, 118 and 119 respectively, run through the b-rings 117. The D-rings 117 and harness straps 118, 119 should have complementary sizes. For example and without limitation, straps 118, 119 may be made of 1½ inch strapping material, and may be comprised of nylon and/or cotton, and the D-rings 117 may have 1½ inch openings therein.

Harness straps 118, 119 may be folded into a compressed form, and held in place using a harness belt 108 that is attached to the D-ring loop 116 between the pockets. In some embodiments, belt 108 may be riveted to D-ring loop 116, and may include dense plie and hook material on complementary surfaces thereof. In some embodiments, these surfaces may be in the form of strips of ¾ inch dense pile and hook material. The complementary surfaces may be pressed against each other for secure interengagement of the belt 108 around the compressed harness straps 118, 119. A release ring 107 is provided on belt 108. In some embodiments, ring 107 may be a 2-inch O-ring. Pulling on the release ring 107 disengages the complementary surfaces of belt 108, releasing the harness straps 118, 119 for use. Rings 121, 122 may be provided at the ends of straps 118, 119 to allow these straps to be manipulated by a user using only one finger. The opposite surfaces of harness straps 118, 119 have dense plie and hook material thereon. This allows straps 118, 119 to be placed over the head and/or head and shoulder of a user, and the opposite surfaces then pressed together against each other for secure interengagement.

A user can adjust the length of the adjusting harness to fit their individual size and need by using the right and/or left adjusting harness straps 118, 119 with the attached rings 121, 122. To adjust the harness, the user simply uses the attached ring to pull the strap outward and away from its base to lengthen or shorten the strap, and then presses the two sides of the strap back together to close it at the desired length. This is all possible as the inside of the right and left adjusting harness straps 118, 119 are covered with dense pile and hook material, 120, which serves to hold the strap in position when pressed together. If the person is to use their right hand, then they would use the right adjusting harness strap 118 to shorten or lengthen the harness. If the person is to use their left hand, then they would use the left adjusting harness strap 119 to shorten or lengthen the harness. In this way, the harness can quickly be adjusted to fit a child in a school or, be adjusted to fit a large man in an office building all with one finger using the attached rings.

In the illustrated embodiment, a lever 100 is provided. One portion 141 of lever 100 is designed secure engagement with the upper handle 99 of the fire extinguisher, and an opposite portion 143 of lever 100 is attached to the fire extinguisher hose 102. lever 100 may be provided in any suitable shape, and functions as a lever so that when the hose 102 is raised, the lever 100 presses against the upper handle 99 of the fire extinguisher causing it to discharge. In the illustrated embodiment of FIGS. 5 and 6, lever 100 has a generally L-shape, with an upper segment 141 and a lower segment 143, but any suitable shape may be used. The size and shape of lever 100 will depend on the size and shape of the fire extinguisher it is used with, and the angle of the upper handle 99. Ordinarily, the upper segment 141 will be shorter than the lower segment 143, with the upper (generally horizontal) segment corresponding generally to the diameter of the fire extinguisher, and the lower (generally vertical) segment corresponding to the height of the fire extinguisher. For example and without limitation, in some embodiments, lever 100 may be in the form of an is solid aluminum bar measuring 1½ inches wide, ¼ inch thick, with a total length of 14½ inches. In the illustrated embodiment, lever 100 is bent at an angle of approximately 90-degrees at the 5½ inch mark. In the illustrated exemplary embodiment shown in FIGS. 5-6, this angle is slightly more than 90 degrees. This bend gives the aluminum bar a generally "L" shape forming a lever having a 5½ inch generally horizontal upper segment 141 and a 9-inch vertical lower segment 143. Neither segment is flexible as the entire lever remains rigid. It is to be appreciated that the angle between the upper segment 141 and the lower segment 143 may not be exactly 90 degrees, but may vary according to the angle of the upper handle 99 of the fire extinguisher relative to the fire extinguisher body 95.

Referring to FIGS. 1-8, it is seen that in the illustrated embodiments, an anchor 101 is provided on the generally horizontal segment of the lever 100 for secure engagement with the upper handle 99. In some embodiments, anchor 101 may be in the form of a strap having a dense pile and hook strip 111 that is attached to the generally horizontal segment of the lever 100, and wrapped around the upper handle 99 of the fire extinguisher. In some embodiments, strip 111 may be riveted or otherwise firmly attached to bracket 100. The riveted dense pile and hook strip 111 may be wrapped under the upper handle 99 of the fire extinguisher and then over the generally horizontal portion of the lever, joining the lever 100 and upper handle 99 tightly together. This holds the lever in position over the upper handle, forming the lever handle anchor and allows the lever and handle to move in unison. It is to be appreciated that in other embodiments, any suitable clamp may be used to secure lever 100 against upper handle 99.

Figure 5:
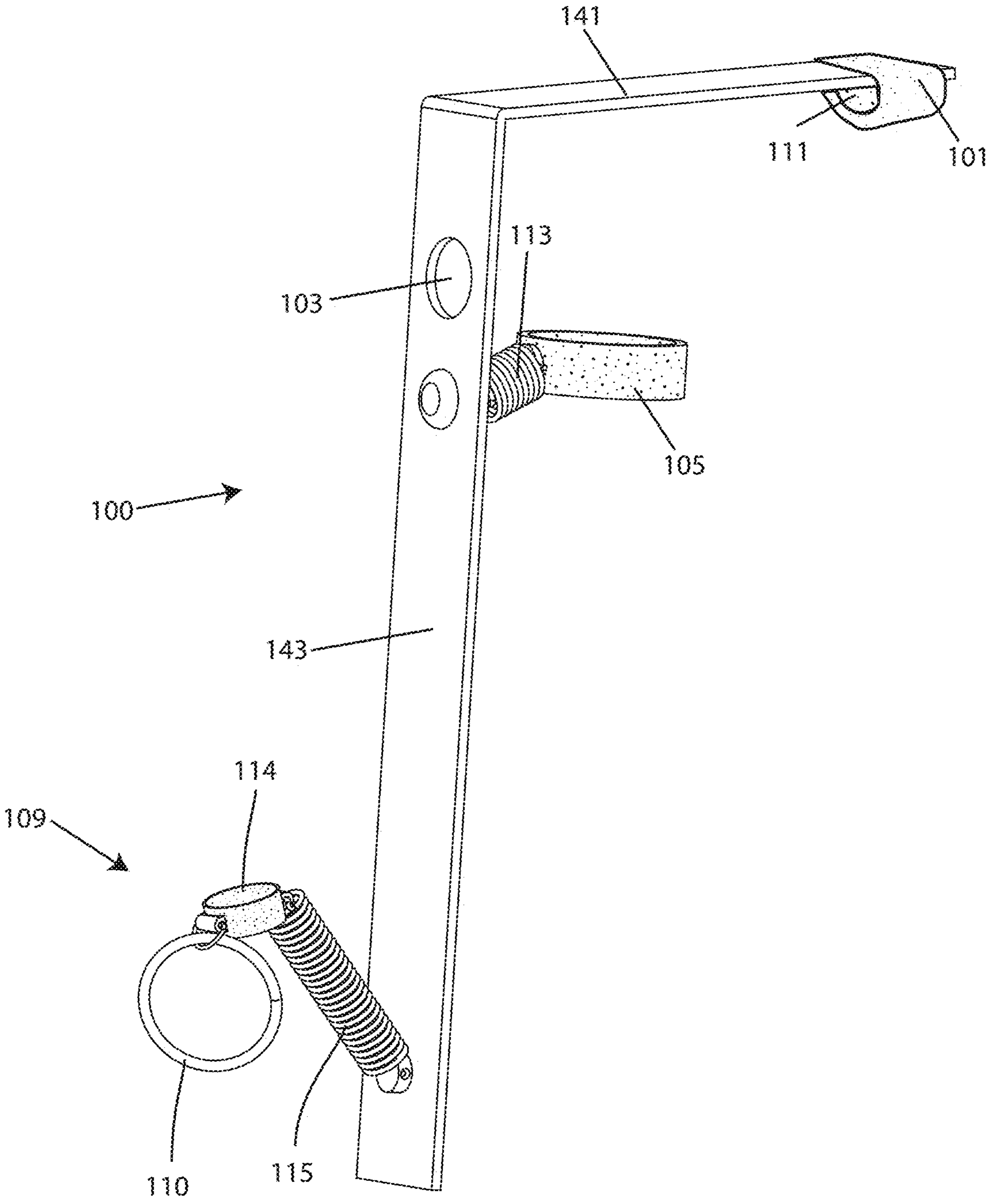
FIG. 5 is a perspective view of an embodiment of a lever of the present invention.
Figure 6:
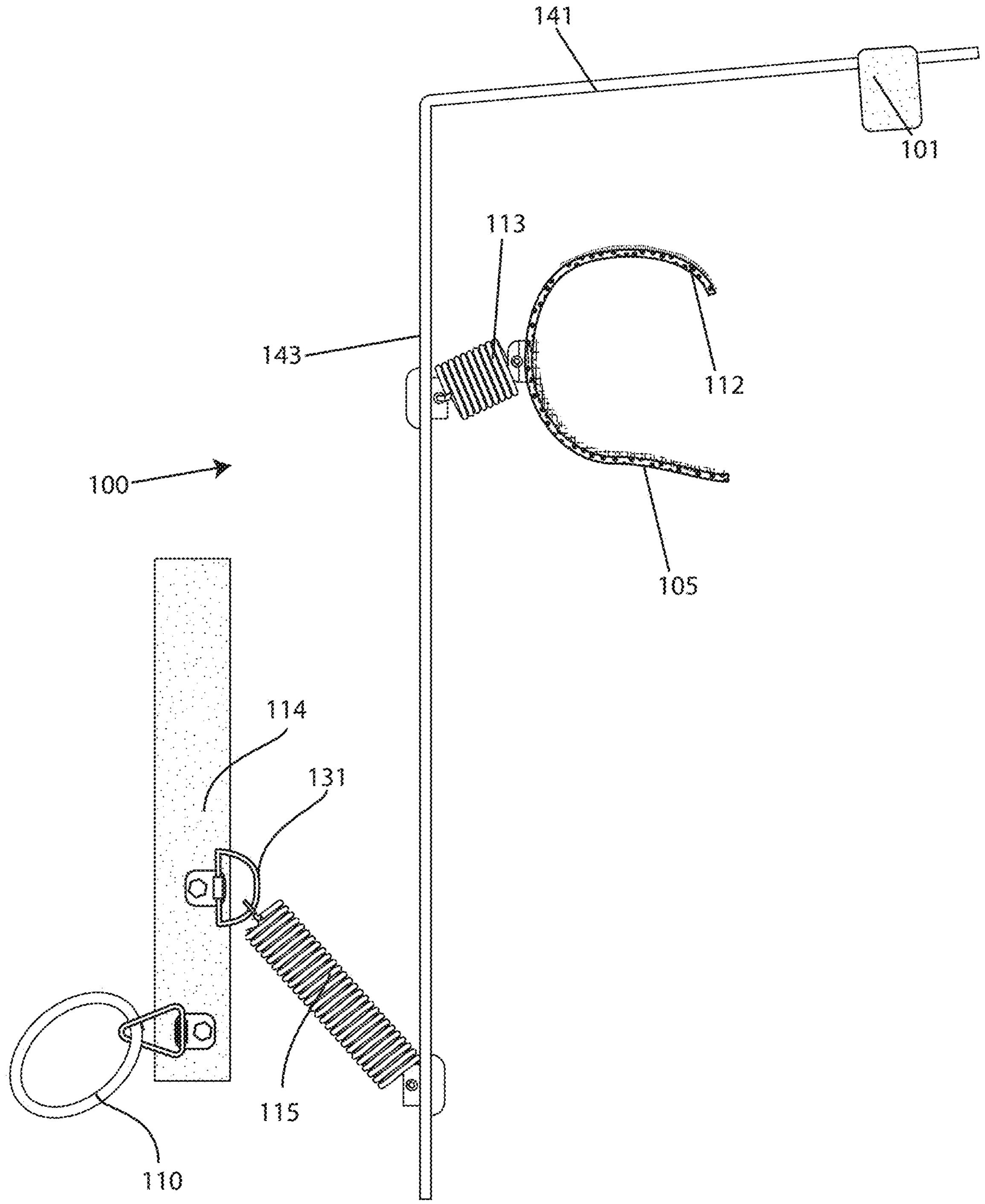
FIG. 6 is a side view of an embodiment of a lever of the present invention.
Figure 7:
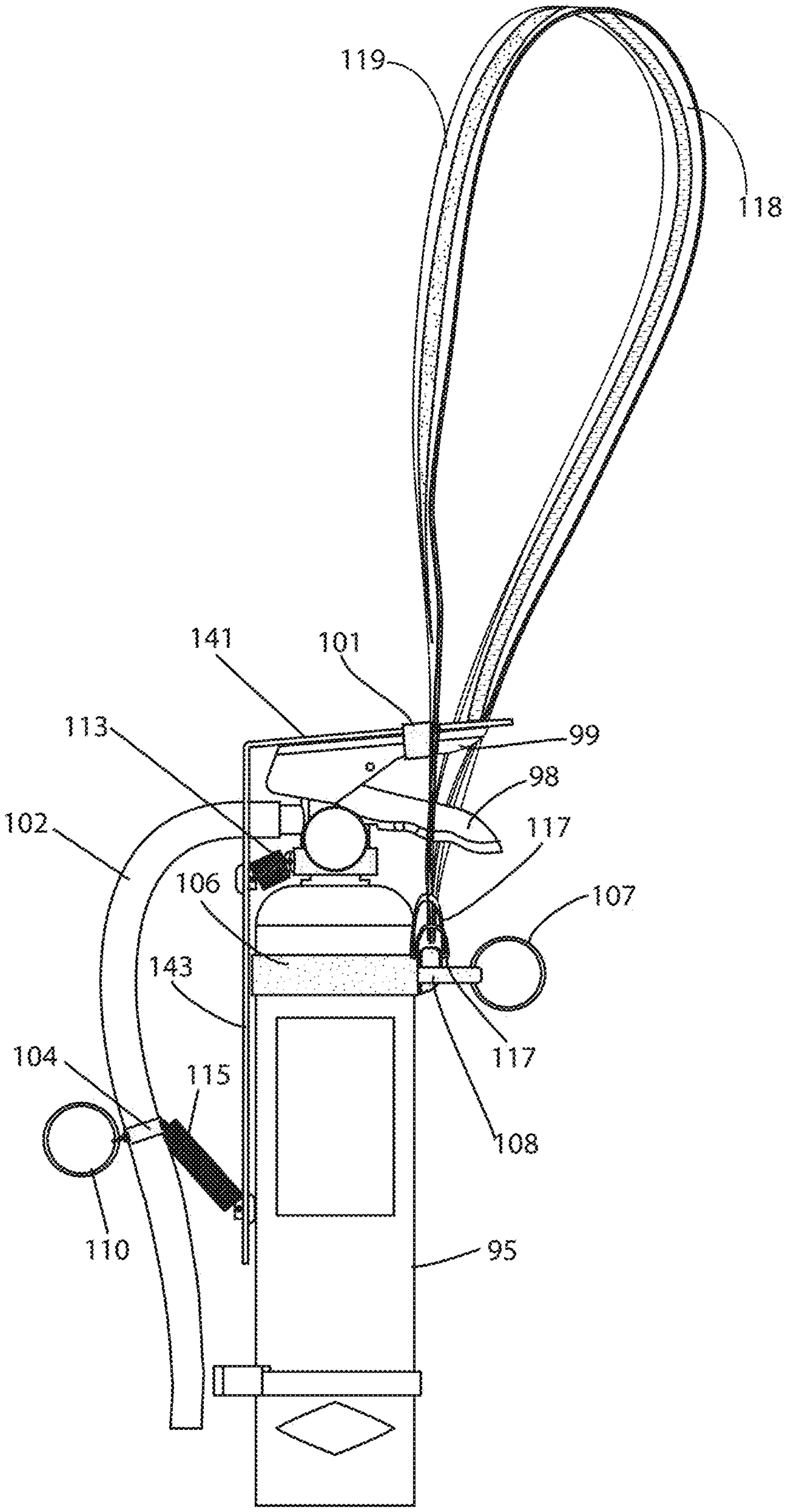
FIG. 7 is a front view of an embodiment of the present invention showing the harness in a released condition.

An opening or hose portal 103 is provided in lever 100 through which the fire extinguisher hose 102 may be inserted. In the illustrated embodiments, hose portal opening 103 is provided in the lower vertical segment 143 of lever 100, as shown in FIG. 5. In most embodiments, hose 102 is inserted through opening 103, and lever 100 is slid up along the hose 102 before the upper portion 141 of lever 100 is attached to the upper handle 99 using anchor strap 101. Once the lever 100 has been slid upward, the upper segment 141 of lever 100 is attached to the upper handle 99 using anchor strap 101, and the lower segment 143 is attached to a spring neck assembly 104 at the collar of the fire extinguisher.

Embodiments of the spring-neck assembly 104 include a strap 105 that is wrapped around the collar of the fire extinguisher. Strap 105 may include strips of dense pile and hooks for interengagement. A stretchable spring 113 is attached between the strap 105 and the lower portion 143 of the lever 100. In some embodiments, spring 113 may be a 7⁄16 inch by 1½ inch extension spring, and strap 105 may include a 1-inch wide, dense pile and hook strip 112 at one end. The dense pile and hook strip 112 may be then wrapped around the neck of the fire extinguisher for holding the vertical portion of lever 100 in place. In some embodiments, the other end of the extension spring 113 may be attached to lever 100 using a D-ring that may be riveted into the vertical segment 143 of the lever 100. It is to be appreciated that spring 113 is designed to flexibly urge the vertical portion of lever 100 against the body/cannister 95 of the fire extinguisher.

In embodiments of the invention, an exterior surface of the lower portion of lever 100 is attached to the fire extinguisher hose 102 using a spring-hose assembly 109. This assembly is similar to the spring-neck assembly, and includes a strap 114 for engagement around the hose 102, and a spring 115 extending between the strap 114 and the lever 100. A strip of dense pile and hooks 114 may be provided on strap 114. In some embodiments, D-rings 131, 132 may be attached to the strap 114 and to the lever 100, with spring 115 extending between the D-rings. It is to be appreciated that spring 115 may be attached using other suitable fasteners including without limitation rivets, snaps, clamps and the like. An O-ring 110 is also attached to strap 114. Once strap 114 is engaged around hose 102, O-ring 110 may be used to manipulate the end of hose 102 using only one finger. When not in use, spring 115 urges the hose against an exterior surface of the lower, vertical segment 143 of lever 100. In the illustrated embodiments, the spring-hose ring assembly 109 joins the lever 100 and the hose 102 together to work in unison.

In embodiments of the invention, the spring-hose assembly 109 may include a D-ring 132 which is attached to the lever 100 by rivet. In embodiments of the invention, a 2½ inch extension spring 115 may be looped into the D-ring 132. This spring 115 may also be looped into a separate D-ring 131, that is riveted into the dense pile and hook strip 114. In some embodiments, the hose ring 110 may have a 2-inch diameter, and may be looped into the riveted D-ring 131. In embodiments of the invention, the dense pile and hook strip 114 may be wound around the hose 102 holding it securely and maintaining its attachment to the lever 100.

The hose ring, 110, is used to maneuver the hose, 102, while the fire extinguisher is in use and to discharge the fire extinguisher at the same time. Discharging the fire extinguisher is accomplished by using the hose ring 110 to pull the hose 102 outward and away from the fire extinguisher body/cannister 95. The act of pulling the hose 102 also pulls the lower segment of the lever 100 away from the cannister. The force on the lower (vertical) segment of the lever 100, pulling outward, forces the generally horizontal segment of the lever 100 downward. Since the generally horizontal segment of the lever 100 and the upper handle 99 of the fire extinguisher are attached by the lever-handle anchor 101, the downward force on the generally horizontal segment of the lever 100 makes the upper handle plunge, compressing the two handles 98, 99 together resulting in the discharge of the unit.

Figure 9:
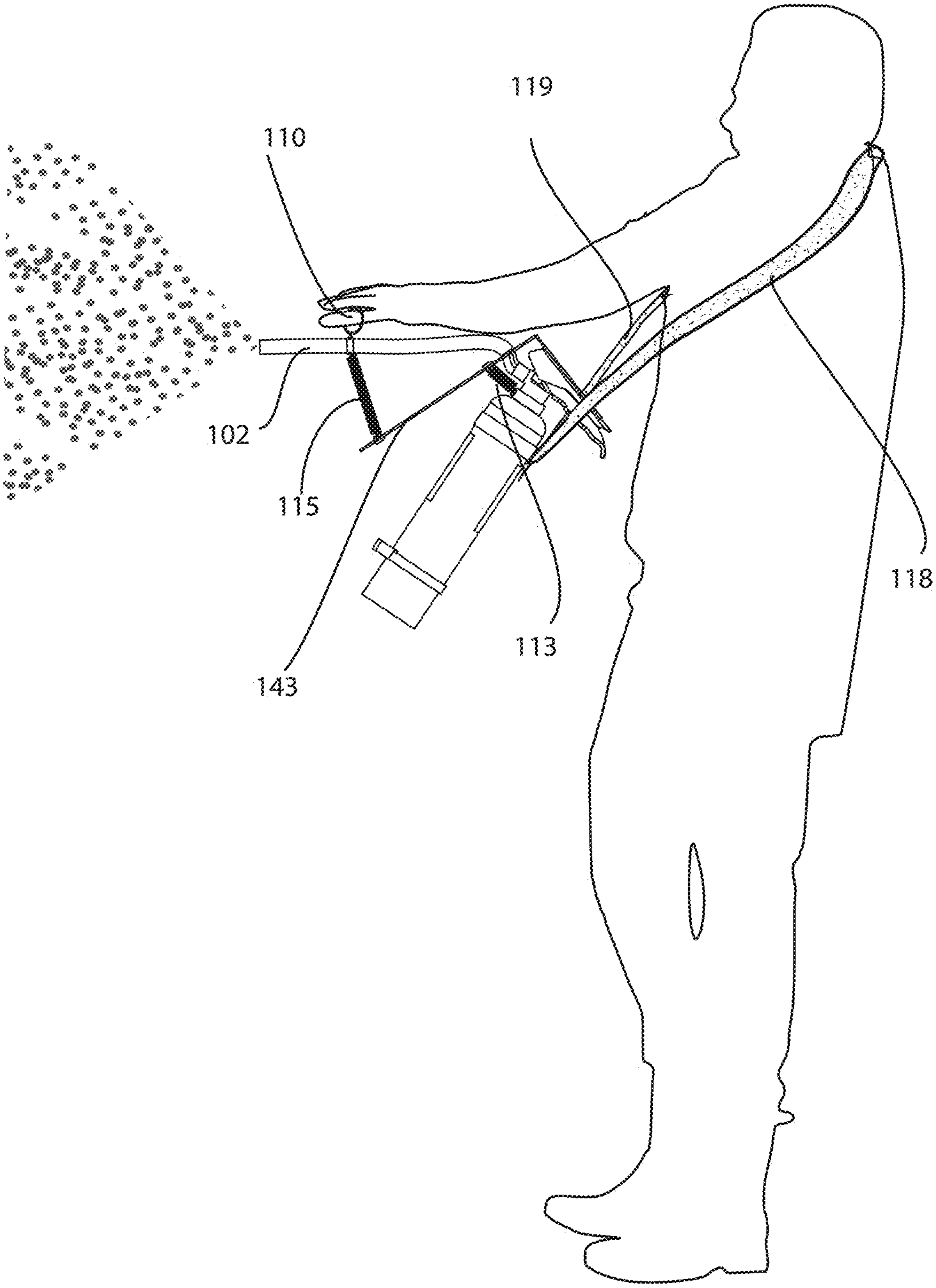
FIG. 9 is a perspective view of an embodiment of the present invention showing the harness engaged around the neck of an individual, and the individual operating the fire extinguisher.

In use, the grip strip 106 is firmly secured to the body/cannister 95 of a fire extinguisher, and the harness straps 118, 119 are folded up and secured with belt 108. The fire extinguisher hose 102 is passed through opening 103 on lever 100, and an upper segment of lever 100 is anchored to the upper handle 99 of the fire extinguisher. The spring-neck assembly 104 is engaged between the lever 100 and the upper collar of the fire extinguisher, and the spring-hose assembly 109 is engaged between the lever 100 and the lower end of the hose 102. A user may then pull release ring 107 to gain access to harness straps 118, 119 and may then pull them around the neck and/or shoulder(s) of the user using end rings 121, 122. Once the user has adjusted the length of straps 118, 119 to position the fire extinguisher, opposite surfaces of straps 118, 119 may be pressed against each other for secure interengagement. This allows the user to carry the fire extinguisher by the harness without the use of the users arms, hands or fingers. The extinguisher is now able to be carried by the user either crossbody or around their neck to the fire site without having to use a hand to do so. The hose of the fire extinguisher 102 may then be manipulated using the O-ring 110 using as little as one finger, as shown in FIG. 9. Pulling the O-ring 110 up raises the hose 102 as well as the lower segment of the lever 100. This causes the upper segment of the lever 100 to depress the upper handle 99 of the fire extinguisher, discharging fire retardant through the hose as it is being pointed by the user.

It is to be understood that variations, modifications, and permutations of embodiments of the present invention, and uses thereof, may be made without departing from the scope of the invention. It is also to be understood that the present invention is not limited by the specific embodiments, descriptions, or illustrations, or combinations of either components or steps disclosed herein, and that different combinations of the features of the illustrated embodiments may be used in other embodiments, all within the scope of the invention. The illustrated embodiments were chosen and described in order to best explain the principles of the invention and its practical application, to thereby enable others skilled in the art to best utilize the invention and various embodiments with various modifications as are suited to the particular use contemplated. Although reference has been made to the accompanying figures, it is to be appreciated that these figures are exemplary and are not meant to limit the scope of the invention. It is intended that the scope of the invention be defined by the claims appended hereto and their equivalents.

NO WARRANTIES

The preceding detailed description has been prepared to solely comply with the provisions of 35 U.S.C. § 112, and does not constitute a commercial warranty, (either expressed or implied), as to the effectiveness of the apparatus and methods disclosed herein, nor does this disclosure constitute any type of certification or guarantee of any particular outcomes. Therefore, this disclosure may not be relied upon to support any future legal claims including, but not limited to, breach of warranty of merchantability, or fitness for any particular purpose which is directed, in whole, or in part, to the present apparatus or methods.

What is claimed is:

1. An apparatus for use with a portable hose-equipped fire extinguisher comprising:

a. a lever having a first segment that is firmly engaged with a handle of the fire extinguisher, and a second segment that extends along a body of the fire extinguisher, the second segment having an opening therein for receiving a hose of the fire extinguisher;

b. a hose directing assembly flexibly attached between the second segment of the lever and a distal end of the hose, the hose directing assembly including a first strap around the hose and a first directing ring attached to said first strap;

c. a harness assembly comprising at least one second strap wherein a proximal end of the at least one second strap is engaged with the body of the fire extinguisher, a distal end of the at least one second strap is attached to a second adjustment ring, and a loop and pile material is provided on at least one surface of the at least one second strap for detachably secure interengagement of the at least one second strap against itself; and d. a belt having a third release ring thereon with a second loop and pile material on at least one surface thereof for detachably secure interengagement of the belt against itself that releasably holds the harness assembly in a folded-up condition against said fire extinguisher body.

2. The apparatus of claim 1 wherein the hose directing assembly further comprises a first spring connected between the hose and the second segment of the lever for urging the hose against the second segment of the lever.

3. The apparatus of claim 1 further comprising a third strap engaged around a neck of the fire extinguisher wherein a third loop and pile material is provided on at least one surface thereof for detachably secure interengagement of the third strap against itself and around said neck, and a second spring is attached between the third strap and the second segment of said lever for urging the second segment of the lever against the body of the fire extinguisher.

4. The apparatus of claim 1 further comprising a grip strip engaged around the body of the fire extinguisher, and a fourth strap provided between said grip strip and said harness assembly, said fourth strap having a first pocket at a proximal end thereof for receiving said grip strip, and a second pocket at a distal end thereof for receiving at least one D-ring, and wherein said at least one second strap extends through said at least one D-ring.

5. The apparatus of claim 1 further comprising a fifth strap engaged around the first segment of the lever and an upper handle of the fire extinguisher.

6. The apparatus of claim 1 wherein the first and second segments of said lever meet at an angle of 90 degrees.

7. A method for operating a hose-equipped fire extinguisher by a person having limited physical mobility comprising the steps of:

a. pulling a release ring attached to a releasable belt to release a folded-up harness assembly attached to the fire extinguisher;

b. wrapping a first strap of said harness assembly over a head or shoulder of a user and adjusting the length of said strap using a ring attached at a distal end of said strap;

c. pressing surfaces of said first strap against each other to interengage a pile and loop material on said surfaces to secure said first strap against itself; and d. pulling on a directing ring attached to a second strap at a distal end of a hose of said fire extinguisher to direct a discharge from said fire extinguisher, wherein said second strap is flexibly attached to a second segment of a lever, said lever having a first segment that is securely engaged against a handle of said fire extinguisher such that directing said hose causes the first segment of said lever to depress said handle resulting in a discharge through said hose.

8. A method of equipping a portable hose-equipped fire extinguisher for use by a person having limited physical mobility comprising the steps of:

a. attaching a first segment of a lever with an upper handle of the fire extinguisher;

b. extending a hose of the fire extinguisher through an opening in a second segment of said lever;

c. attaching a first strap to a distal end of said hose, wherein a directing ring is attached said first strap, and a spring is connected between said first strap and a distal end of the second segment of said lever;

d. attaching a harness assembly to said fire extinguisher on a side opposite from said hose, said harness assembly comprising at least one second strap wherein a proximal end of the at least one second strap is engaged with a body of the fire extinguisher, a distal end of the at least one second strap is attached to a second adjustment ring, and a loop and pile material is provided on at least one surface of the at least one second strap for detachably secure interengagement of the at least one second strap against itself; and e. folding up the harness assembly and temporarily securing the harness assembly against said fire extinguisher using a belt having a third release ring thereon with a second loop and pile material on at least one surface thereof for detachably secure interengagement of the belt against itself that releasably holds the harness assembly in a folded-up condition against said fire extinguisher body.

9. The method of claim 8 comprising the additional step of attaching a third strap around a neck of the fire extinguisher wherein a third loop and pile material is provided on at least one surface thereof for detachably secure interengagement of the third strap against itself and around said neck, wherein a second spring is attached between the third strap and the second segment of said lever for urging the second segment of the lever against the body of the fire extinguisher.

10. The method of claim 8 comprising the additional step of attaching a grip strip around the body of the fire extinguisher, wherein a fourth strap is provided between said grip strip and said harness assembly, said fourth strap having a first pocket at a proximal end thereof for receiving said grip strip, and a second pocket at a distal end thereof for receiving at least one D-ring, and wherein said at least one second strap extends through said at least one D-ring.

11. The method of claim 8 comprising the additional step of attaching a fifth strap around the first segment of the lever and an upper handle of the fire extinguisher.

* * * * *